(12) United States Patent
Kodama et al.

(10) Patent No.: US 11,364,792 B2
(45) Date of Patent: Jun. 21, 2022

(54) AIR INTAKE STRUCTURE FOR VEHICLE

(71) Applicant: MAZDA MOTOR CORPORATION, Hiroshima (JP)

(72) Inventors: Shin Kodama, Kure (JP); Makoto Shinhama, Hiroshima (JP); Kenji Sugasaki, Hiroshima (JP); Kazumi Okamura, Hatsukaichi (JP); Ken Yoshida, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 399 days.

(21) Appl. No.: 16/490,883

(22) PCT Filed: Feb. 6, 2018

(86) PCT No.: PCT/JP2018/003891
§ 371 (c)(1),
(2) Date: Sep. 3, 2019

(87) PCT Pub. No.: WO2018/173516
PCT Pub. Date: Sep. 27, 2018

(65) Prior Publication Data
US 2020/0122569 A1  Apr. 23, 2020

(30) Foreign Application Priority Data

Mar. 24, 2017  (JP) .............................. JP2017-058559

(51) Int. Cl.
*B60K 13/02* (2006.01)
*F02M 35/10* (2006.01)

(52) U.S. Cl.
CPC ....... *B60K 13/02* (2013.01); *F02M 35/10137* (2013.01); *F02M 35/10144* (2013.01)

(58) Field of Classification Search
CPC ............ B60K 13/02; F02M 35/10137; F02M 35/10144
See application file for complete search history.

(56) References Cited

U.S. PATENT DOCUMENTS 5,176,551 A * 1/1993 Blanchard ........ F02M 35/10013
440/77

FOREIGN PATENT DOCUMENTS

| JP | S59-67329 U | 5/1984 |
| JP | S61-190464 U | 11/1986 |
| JP | 2013-119384 A | 6/2013 |

OTHER PUBLICATIONS

International Search Report issued in PCT/JP2018/003891; dated May 15, 2018.
Office Action issued in JP 2017-058559; mailed by the Japanese Patent Office dated Sep. 5, 2018.

* cited by examiner

*Primary Examiner* — Jacob M Amick
(74) *Attorney, Agent, or Firm* — Studebaker & Brackett PC

(57) ABSTRACT

A vehicle includes an engine, an engine cover, and a cross component. The engine cover has a through-hole through which the cross component passes. The cross component is a flexible hose or a flexible pipe in which a body part extending in a cross direction is integrated with a diameter enlarged part having a diameter larger than the body part. The outer peripheral part of the diameter enlarged part makes close contact with the inner peripheral surface of the through-hole of the engine cover.

20 Claims, 7 Drawing Sheets

AIR INTAKE STRUCTURE FOR VEHICLE

TECHNICAL FIELD

The present disclosure relates to an air intake structure for a vehicle and, more particularly, to an air intake structure for a vehicle in which the upper side and a lateral side of an engine are covered with an engine cover.

BACKGROUND ART

Conventionally, an engine cover is sometimes disposed so as to cover the upper side and the lateral side of an engine in an engine room. The structure of such an engine cover is disclosed in PTL 1.

PTL 1 discloses a structure in which an upper surface cover that covers the upper side of an engine, a lateral surface cover that covers the lateral side of the engine, and a rear surface cover that covers the rear side are formed integrally. Insulators made of polyurethane foam are attached to the inner surface sides of the upper surface cover, the lateral surface cover, and the rear surface cover.

The engine cover disclosed in PTL 1 is provided so as to cover not only the engine, but also exhaust system components and a transmission. By providing the engine cover with the structure described above, the heat retaining capability of engine can be obtained and environmental loads can be reduced by improving fuel economy and reducing $CO_2$ and the like in exhaust gas.

CITATION LIST

Patent Literature

PTL 1: JP-A-2013-119384

SUMMARY OF INVENTION

However, when the upper side and the lateral side of the engine are covered with the engine cover as described above, some of air intake system components need to be disposed on the outer side thereof and the air intake system components need to cross the inner side and the outer side of the engine cover. In this case, however, there is a concern that the number of components needs to increase to ensure sealability in the related art. That is, when the air intake system components cross the inner side and the outer side of the engine cover, a seal material must be separately provided between the air intake system components and the engine cover to ensure the heat retaining capability and the number of components increases, thereby leading to increase in the manufacturing cost.

The present disclosure addresses the above problems with an object of providing an air intake structure for a vehicle capable of obtaining the sealability while having a component that crosses the inner side and the outer side of the engine cover that covers the upper side and the lateral side of the engine and suppressing increase in the number of components and the manufacturing cost.

The air intake structure for a vehicle according to an aspect of the present disclosure includes an engine, an engine cover that covers the upper side and the lateral side of the engine, and a cross component that crosses the inner side and the outer side of the engine cover.

The engine cover has a through-hole through which the cross component passes.

The cross component is a flexible hose or a flexible pipe and formed by integrating a body part that extends in the direction in which the cross component crosses with a diameter enlarged part having a diameter larger than the body part, and the outer peripheral part of the diameter enlarged part makes close contact with the inner peripheral surface of the through-hole of the engine cover.

DESCRIPTION OF EMBODIMENTS

Figure 1:
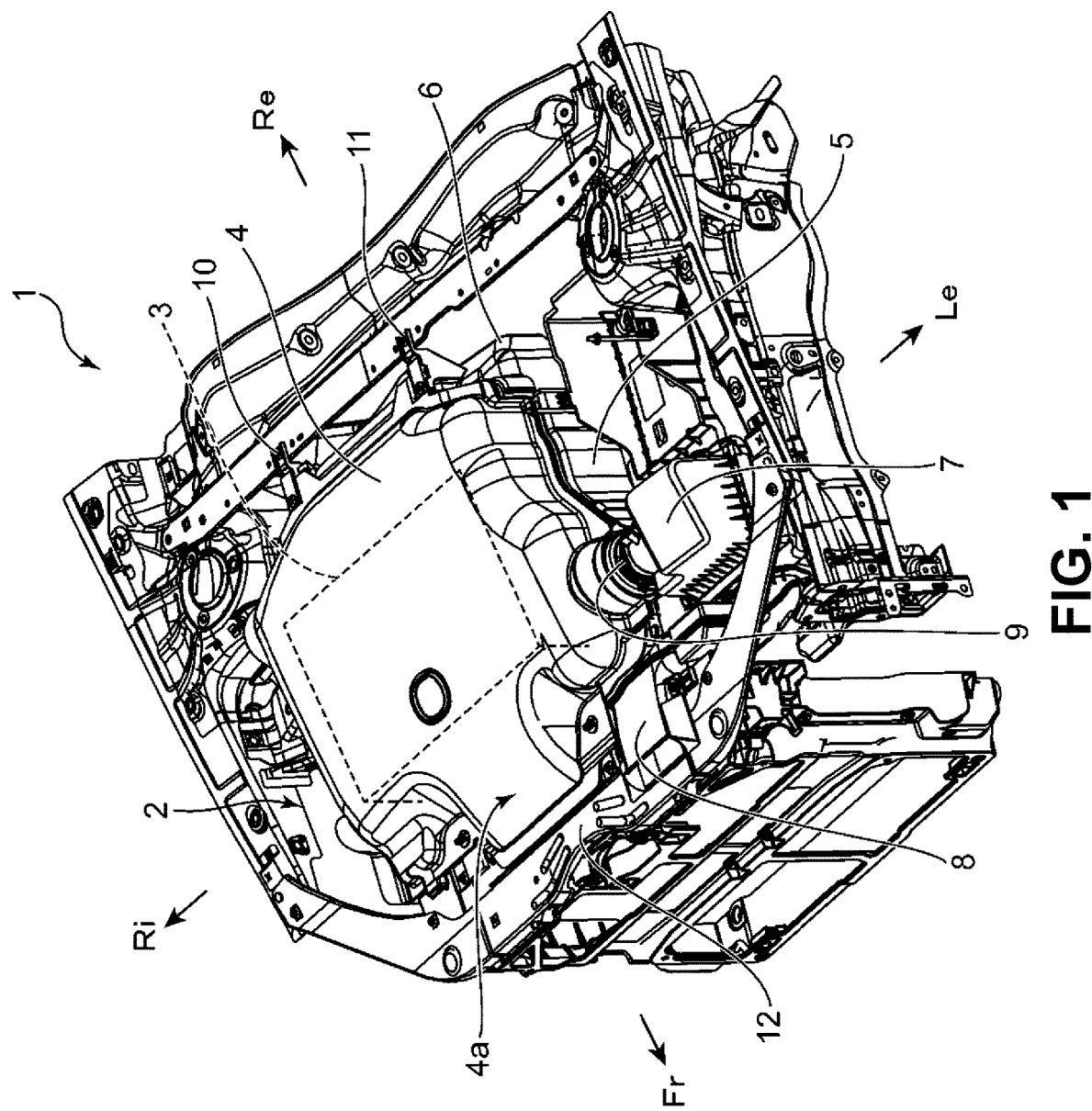
FIG. 1 is a schematic perspective view illustrating a structure in an engine room of a vehicle according to an embodiment.

An embodiment will be described below with reference to the drawings. It should be noted here that the embodiment described below is an aspect of the present disclosure and the present disclosure is not limited to the following embodiment except the essential structure thereof.

In the drawings, "Fr" represents the front side of a vehicle, "Re" represents the rear side of the vehicle, "Le" represents the left side of the vehicle, "Ri" represents the right side of the vehicle, "In" represents the inner side of the vehicle, and "Out" represents the outer side of the vehicle.

Embodiment

1. Schematic Structure in Engine Room 2 of Vehicle 1

The schematic structure in an engine room 2 of a vehicle 1 according to the embodiment will be described with reference to FIG. 1. It should be noted here that FIG. 1 does not illustrate some portions such as a hood.

As illustrated in FIG. 1, an engine 3 is installed in the engine room 2 in the front part of the vehicle 1. The upper side of the engine 3 is covered with an upper engine cover 4, the lateral side is covered with a lateral engine cover 5, and the rear side is covered with a rear engine cover 6.

It should be noted here that, not illustrated in the drawing, the lateral engine cover 5 is also disposed on the right side of the engine 3.

The upper engine cover 4 is supported by and fixed to hinges 10 and 11 provided in the rear side portion of the engine room 2 of the vehicle 1. This enables a front part 4a of the upper engine cover 4 to be lifted upward and makes the front part openable and closable. It should be noted here that the hinges 10 and 11 are fixed to a vehicle body.

In the embodiment, there are an air cleaner 7 and a fresh air duct 8 that are provided in a path for blowing fresh air (air) to the engine 3 and disposed on the outer sides of the engine covers 4, 5, and 6. The air cleaner 7 is a box body in which a filter is accommodated and the air cleaner 7 is disposed on the left side of the engine 3.

The fresh air duct 8 is a pipe body opened toward the front side and disposed on a shroud 12.

A hose 9 is connected to the air cleaner 7. The hose 9 crosses the engine covers 4 and 5 by passing through the through-hole provided in the engine covers 4 and 5 and a part thereof enters an inner side region in which the engine 3 is accommodated.

2. Structures of Engine Covers 4 and 5 in Cross Portions of Hose 9

Figure 2:
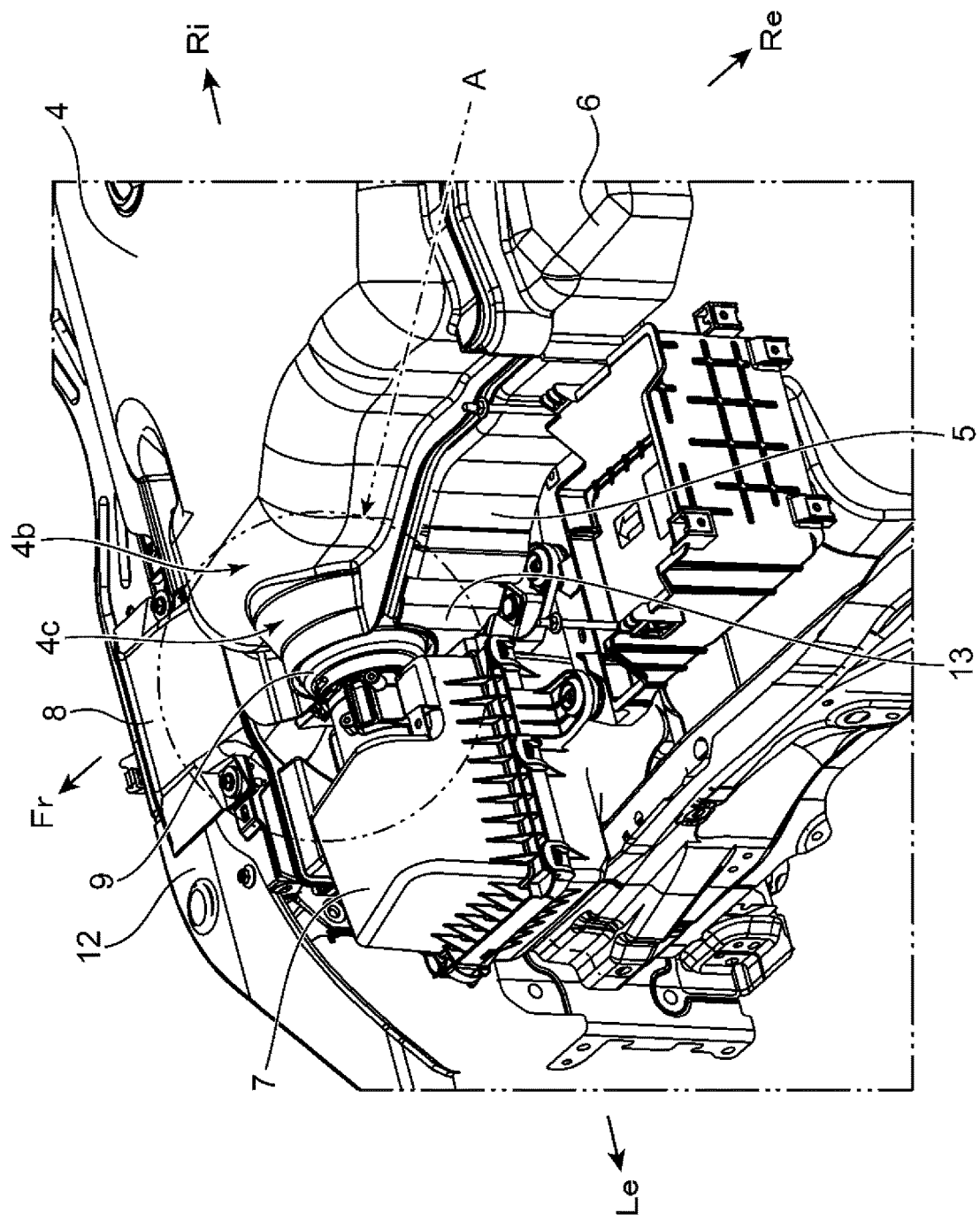
FIG. 2 is a schematic perspective view enlarging a part of the structure in the engine room.

The structures of the engine covers 4 and 5 in the cross portions of the hose 9 will be described with reference to FIG. 2. FIG. 2 is a schematic perspective view enlarging a part of the structure in the engine room 2.

As illustrated in FIG. 2, the upper engine cover 4 also covers a part of the upper part of the lateral side of the engine 3 (lateral part 4b). A through-hole of the upper engine cover 4 through which the hose 9 passes is provided at the boundary portion between the lateral part 4b of the upper engine cover 4 and the lateral engine cover 5 (portion indicated by arrow A). It should be noted here that the cross portion of the upper engine cover 4 through which the hose 9 passes is formed in a semicylinder (hose passing part 4c).

Similarly, the lateral engine cover 5 is also provided with a through-hole through which the hose 9 passes at the boundary portion between the lateral engine cover 5 and the upper engine cover 4 (portion indicated by arrow A). The lateral engine cover 5 is disposed below the portion through which the hose 9 passes and has an under-hose engine cover (cross part lower cover) 13 separated from other portions.

3. Structure of Air Intake Structure Part 18

Figure 3:
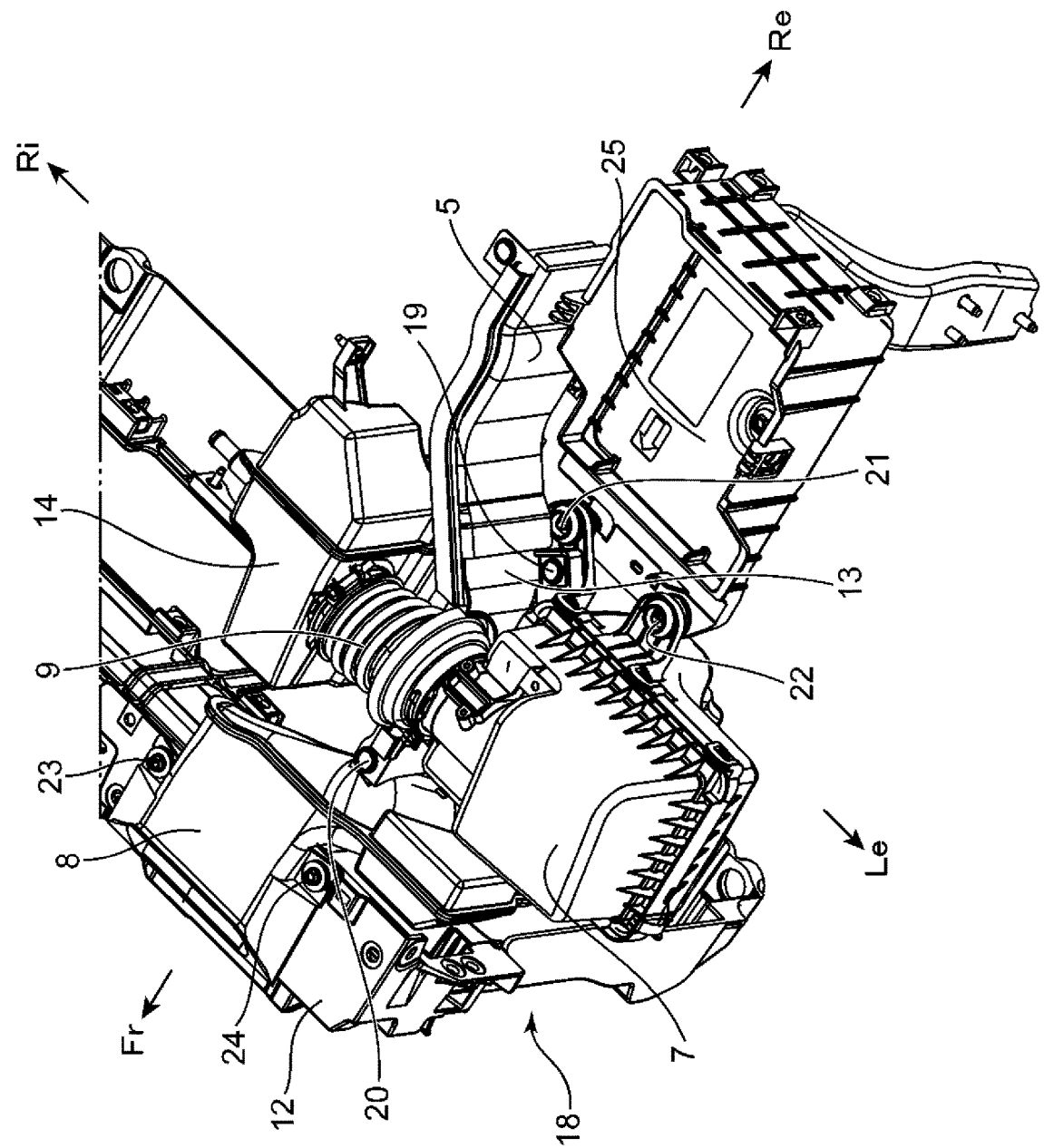
FIG. 3 is a schematic perspective view illustrating a part of an air intake structure part for the vehicle.

The structure of an air intake structure part 18 for the vehicle 1 will be described with reference to FIG. 3. FIG. 3 is a schematic perspective view illustrating a part of the air intake structure part 18 for the vehicle 1. It should be noted here that the upper engine cover 4 is not illustrated in FIG. 3.

As illustrated in FIG. 3, one end of the hose 9 is attached to the air cleaner 7 and the other end is attached to an air intake resonator 14. In the structure of the air intake structure part 18, the air intake resonator 14 is disposed in the inner side covered with the engine covers 4, 5, and 6.

Here, the air cleaner 7 is fixed to the vehicle body by fixing parts (for example, rivets) 21 and 22. Specifically, the air cleaner 7 is fixed to the vehicle body via a battery tray 25 by the fixing parts 21 and 22.

In addition, the fresh air duct 8 is fixed to the shroud 12, which is a part of the vehicle body, by fixing parts (for example, rivets) 23 and 24.

On the other hand, the under-hose engine cover 13 is fixed to the fresh air duct 8 by a fixing part (for example, a rivet) 19 and fixed to the air cleaner 7 by a fixing part (for example, a rivet) 20.

That is, of the structural components of the air intake structure part 18 according to the embodiment, the structural components (the air cleaner 7 and the fresh air duct 8) disposed on the outer sides of the engine covers 4, 5, and 6 are fixed to the vehicle body and the under-hose engine cover 13 is fixed to the structural components (the air cleaner 7 and the fresh air duct 8) fixed to the vehicle body.

4. Hose 9 and Peripheral Structure Thereof

Figure 4:
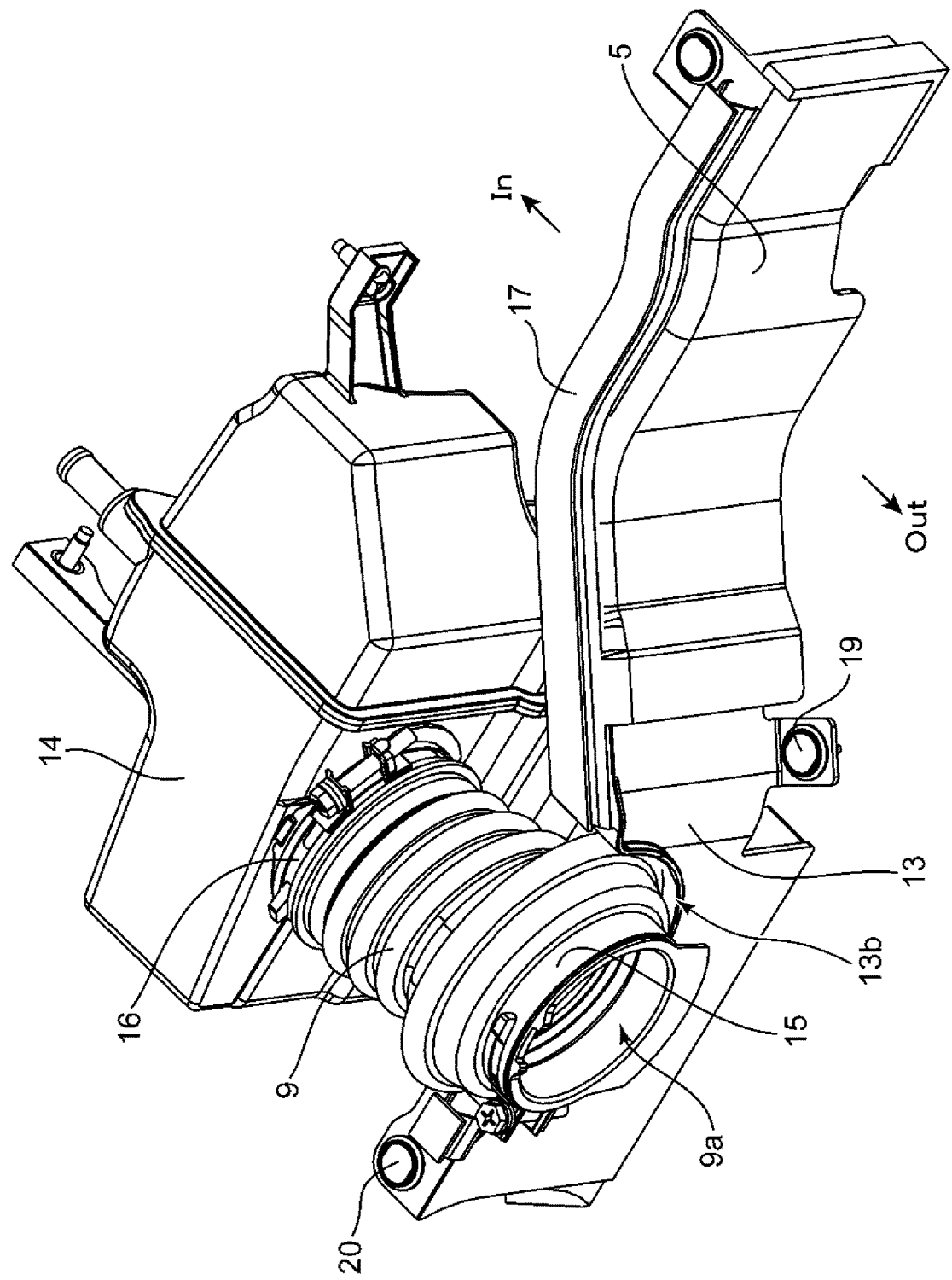
FIG. 4 is a schematic perspective view illustrating a hose and a peripheral structure thereof.
Figure 5:
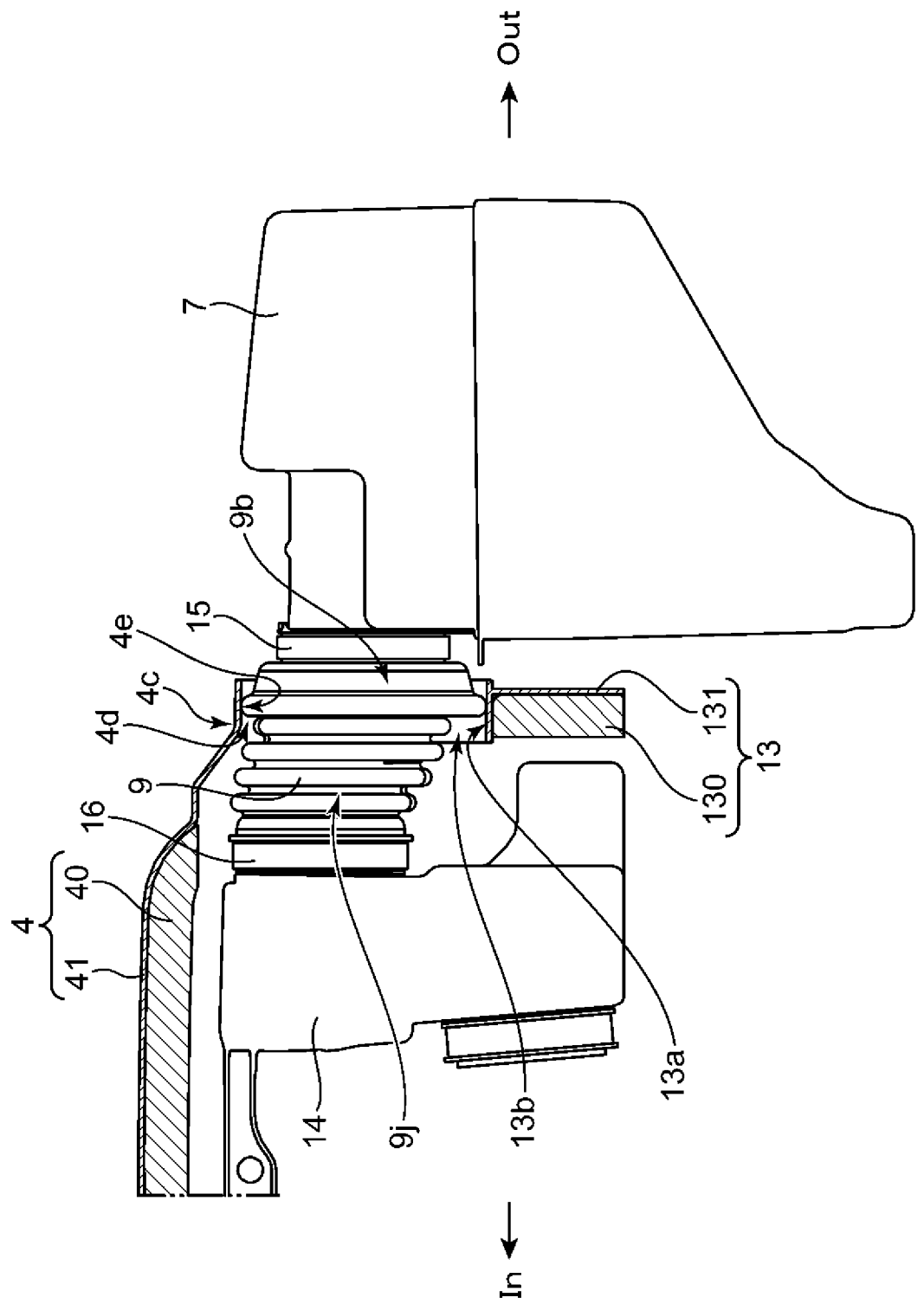
FIG. 5 is a schematic side view illustrating the hose and the peripheral structure thereof.

The hose 9 and the peripheral structure thereof will be described with reference to FIG. 4 and FIG. 5. FIG. 4 is a schematic perspective view illustrating the hose 9 and the peripheral structure thereof and FIG. 5 is a schematic cross sectional view illustrating the hose 9 and the peripheral structure thereof.

As illustrated in FIG. 4, the hose 9 is disposed so as to pass through through-holes 4d and 13b (only the through-hole 13b of the under-hose engine cover 13 is illustrated in FIG. 4) and cross the engine covers 4 and 13. The hose 9 has an opening 9a oriented to the outer side and the opening 9a is connected to the air cleaner 7. A hose band 15 is used to connect the hose 9 to the air cleaner 7.

The opening on the inner side of the hose 9 is connected to the air intake resonator 14 via a hose band 16.

It should be noted here that a packing 17 is provided on the upper end surface (surface in contact with the upper engine cover 4) of the lateral engine cover 5. This ensures high sealability and suppresses the leakage of hot air.

Next, as illustrated in FIG. 5, the upper engine cover 4 has a heat retaining member 40 and a surface member 41 and the under-hose engine cover 13 has a heat retaining member 130 and a surface member 131. Although the portions of the lateral engine cover 5 other than the under-hose engine cover 13 and the rear engine cover 6 are not illustrated in FIG. 5, they have the same structure.

The hose 9 has a body part 9j shaped like a bellows and a diameter enlarged part 9b having a diameter larger than the body part 9j.

The diameter enlarged part 9b makes close contact with an inner peripheral surface 4e that is an inner surface facing downward of the hose passing part 4c of the upper engine cover 4 and an inner peripheral surface 13a that is an inner surface facing upward of the under-hose engine cover 13.

5. Structure of Hose 9

Figure 6:
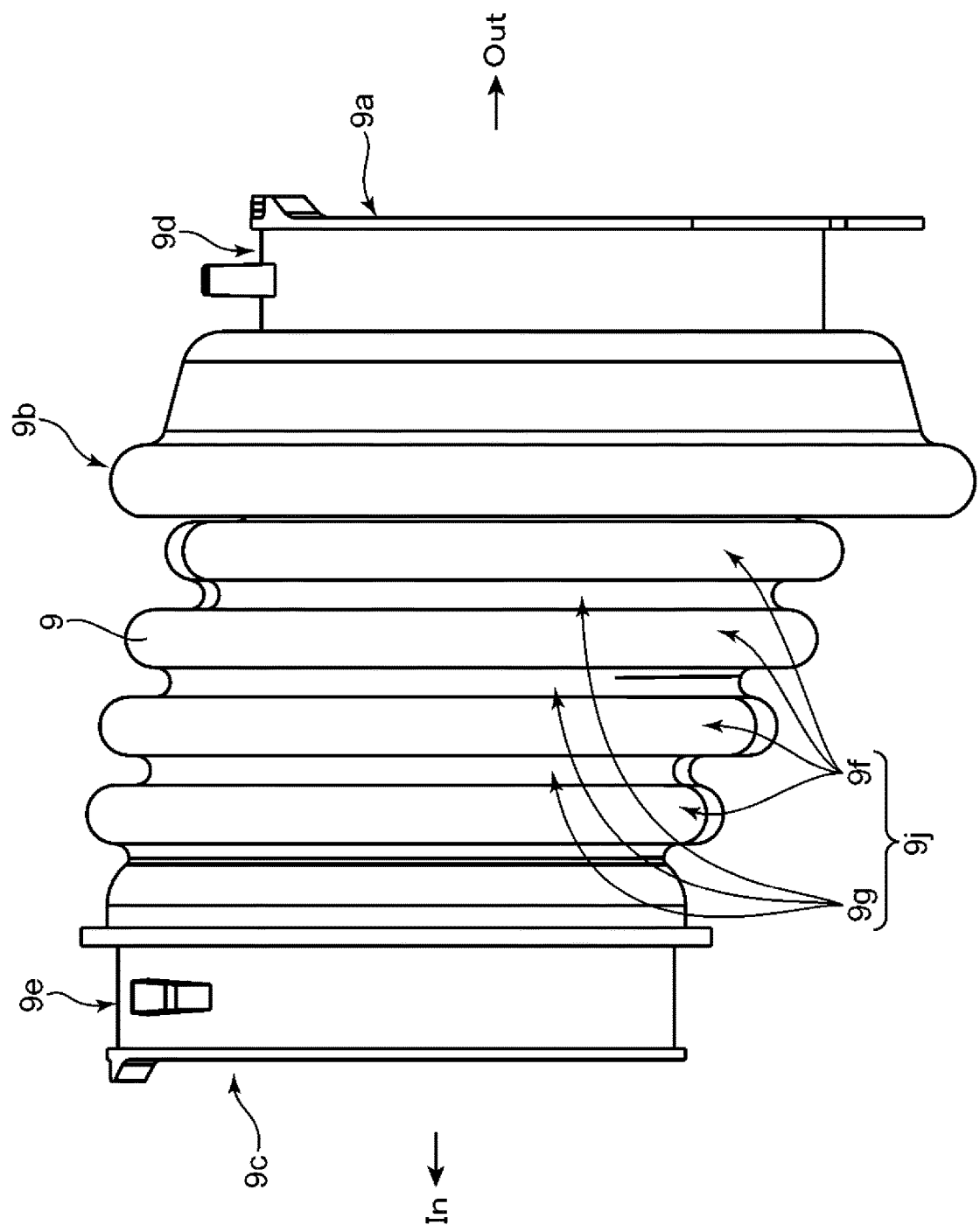
FIG. 6 is a schematic side view illustrating the structure of the hose.
Figure 7:
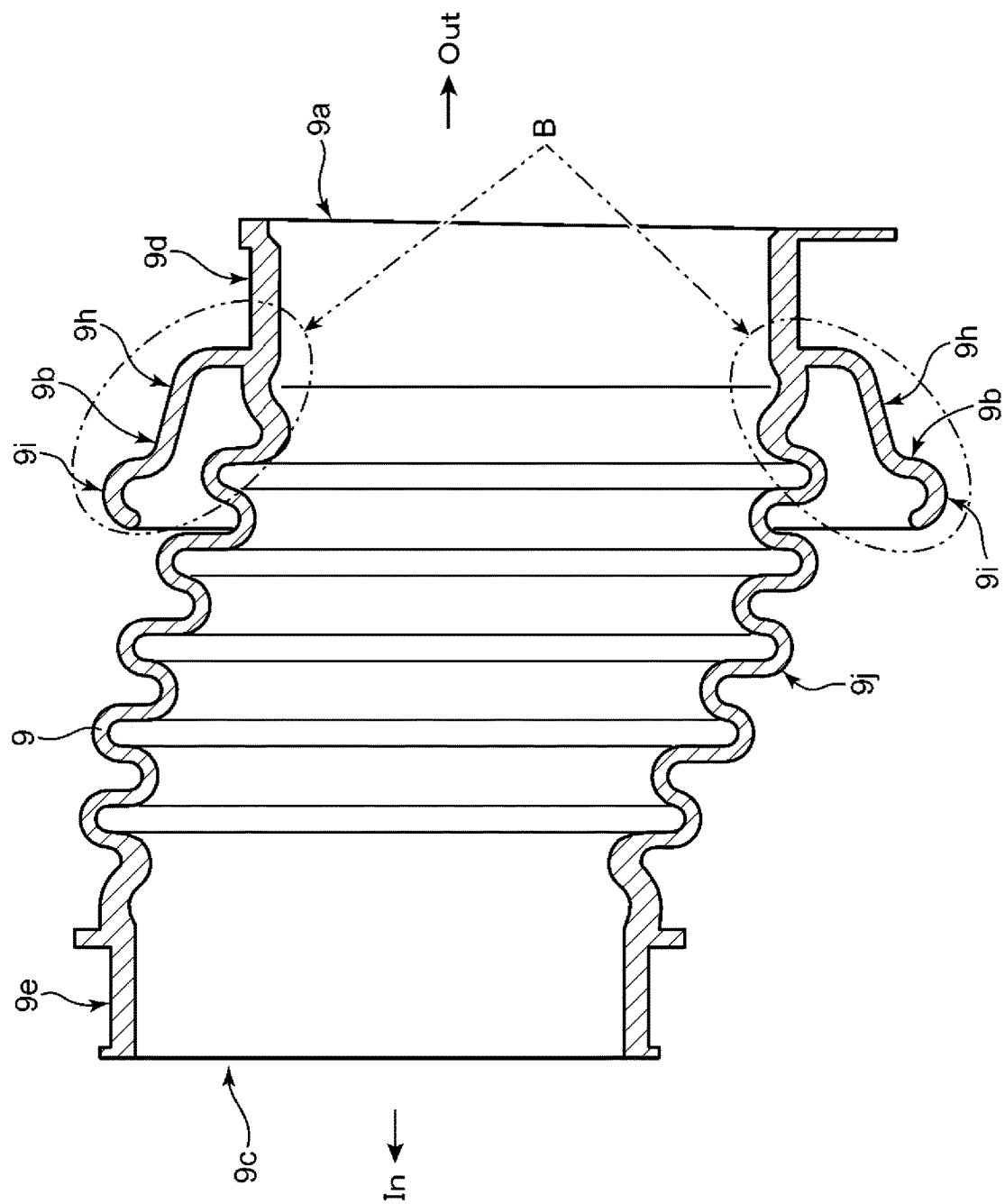
FIG. 7 is a schematic cross sectional view illustrating the structure of the hose.

The structure of the hose 9 will be described more specifically with reference to FIG. 6 and FIG. 7. FIG. 6 is a schematic side view illustrating the structure of the hose 9 and FIG. 7 is a schematic cross sectional view illustrating the structure of the hose 9.

As illustrated in FIG. 6, the hose 9 has the body part 9j shaped like a bellows and the diameter enlarged part 9b formed integrally with the body part 9j. The diameter enlarged part 9b is provided in a portion on the near side of the opening 9a oriented to the outer side the under-hose engine cover 13 (see FIG. 4 and FIG. 5).

A cylindrical joint part 9d is provided between the opening 9a and the diameter enlarged part 9b. The joint part 9d is used for joint to the air cleaner 7 (see FIG. 4 and FIG. 5). In addition, a cylindrical joint part 9e is provided adjacently to an opening 9c oriented to the inner side of the under-hose engine cover 13. The joint part 9e is used for joint to the air intake resonator 14 (see FIG. 4 and FIG. 5).

It should be noted here that the body part 9j is configured by alternately forming a plurality of ridge parts 9f and a plurality of root parts 9g.

As illustrated in FIG. 7, when the hose 9 is seen on the cross section along the axis related to the extension of the body part 9j, the diameter enlarged part 9b has a tapered part 9h and a contact part 9i that is continuous with the end portion thereof (portion indicated by arrow B).

The tapered part 9h has a diameter that gradually increases from the joint part 9d toward the body part 9j. In other words, the tapered part 9h extends obliquely so as to have a diameter that increases from the outer side of the under-hose engine cover 13 to the inner side on the cross section illustrated in FIG. 7.

The contact part 9i is formed so that one end part thereof is continuous with the tip end part of the tapered part 9h and draws an arc. In addition, the other end of the contact part 9i is a free end. The outer peripheral surface of the contact part 9i makes close contact with the inner peripheral surfaces 4e and 13a of the engine covers 4 and 13.

6. Effects

Since the outer peripheral part (contact part 9i) of the diameter enlarged part 9b of the hose 9, which is the cross component, makes close contact with the inner peripheral surfaces 4e and 13a of through-holes 4d and 13b of the engine covers 4 and 13, high sealability (hot air leakage suppression function) can be obtained.

In addition, since the entire body including the body part 9j and the diameter enlarged part 9b is formed integrally in the hose 9 in the embodiment, increase in the number of components and the manufacturing cost can be suppressed.

Accordingly, in the embodiment, high sealability can be obtained while having the hose 9 that passes through and crosses the inner side and the outer side of the engine covers 4 and 13 that cover the upper side and the lateral side of the engine 3 and increase in the number of components and the manufacturing cost can be suppressed.

In addition, since the structure in which the upper engine cover 4, the lateral engine cover 5, the rear engine cover 6, and the under-hose engine cover 13 have the heat retaining members 40 and 130 is adopted in the embodiment, the engine 3 can obtain the high heat retaining capability.

In addition, since the through-holes 4d and 13b of the engine covers 4 and 13 are provided at the boundary portion between the upper engine cover 4 and the under-hose engine cover 13 in the embodiment, the workability for attaching the hose 9 that crosses the through-holes 4d and 13d is high. Therefore, in the embodiment, the manufacturing efficiency can be improved and the manufacturing cost can be reduced.

In addition, since the enlarged diameter part 9b of the hose 9 has the tapered part 9h in the embodiment, even when the internal pressures of the engine covers 4, 5, 6, and 13 become high due to traveling wind or the like, air (hot air) does not leak easily from between the inner peripheral surfaces 4e and 13a of the through-holes 4d and 13b of the engine covers 4 and 13 and the contact part 9i of the hose 9. Here, since the other end of the contact part 9i is a free end, it has high flexibility and is advantageous in obtaining high sealability.

It should be noted here that the tapered part 9h may have not only a form that extends linearly from the outer side to the inner side of the engine covers 4 and 13, but also a form that extends like steps and a form that extends like a curve.

In addition, in the embodiment, the under-hose engine cover 13 is provided as a part of the lateral engine cover 5 and the under-hose engine cover 13 is separated from other portions of the lateral engine cover 5. Therefore, in the embodiment, the hose 9 can be assembled (preassembled) to the under-hose engine cover 13 in advance when the vehicle 1 is manufactured, so the manufacturing efficiency can be improved and increase in the manufacturing cost can be suppressed.

In addition, since the structure in which the under-hose engine cover 13 is fixed to the air cleaner 7 and the fresh air duct 8, which are structural components of the air intake structure part 18 is adopted in the embodiment, highly accurate assembly between the hose 9 and the under-hose engine cover 13 can be achieved. Therefore, high sealability can be obtained in the embodiment.

In addition, since the upper engine cover 4 is openable and closable about the hinges 10 and 11 as fulcrums in the embodiment, the positional accuracy of the upper engine cover 4 with respect to the hose 9 in the closed state can be higher and the sealability can be higher than in a detachable cover.

In addition, since the hose (bellows hose) 9 having the body part 9j shaped like a bellows is adopted in the embodiment, the workability for disposing the hose 9 so as to cross the engine covers 4 and 13 is high and the manufacturing efficiency can be improved. Therefore, increase in the manufacturing cost can be suppressed in the embodiment.

[Modifications]

Although the hose 9 with the body part 9j shaped like a bellows is adopted as one example of the cross component in the above embodiment, the present disclosure is not limited to this example. Various hoses or pipes may be adopted as long as the body part and the diameter enlarged part are formed integrally with each other and are flexible.

Although the material of the hose 9 is not specifically described in the above embodiment, any flexible material may be used. For example, rubber or resin may be adopted.

In addition, although the structure in which the air intake resonator 14 is disposed in the spaces in the engine covers 4, 5, 6, and 13 is adopted in the above embodiment, the present disclosure is not limited to this example. The air intake resonator does not need to be included in the structure of the air intake structure part or may be disposed on the outer sides of the engine covers 4, 5, 6, and 13.

In addition, although the under-hose engine cover 13 is provided as a part of the lateral engine cover 5 and the under-hose engine cover 13 is separated from other portions of the lateral engine cover 5 in the above embodiment, the present disclosure is not limited to this example. For example, the lateral engine cover 5 may be integrally formed so as to include the under-hose engine cover 13.

In addition, although the engine covers 4, 5, 6, and 13 are formed by the heat retaining members 40 and 130 and the surface members 41 and 131 in the above embodiment, the present disclosure is not limited to this example. For example, the surface member may also be disposed on the inner surface side of the heat retaining members so as to be sandwiched between the surface members disposed on the outer side and the inner side.

In addition, although the upper engine cover 4 is openable and closable about the hinges 10 and 11 as fulcrums in the above embodiment, the present disclosure is not limited to this example. For example, a detachable upper engine cover may be adopted.

In addition, although the hose 9 passes through and crosses the boundary portion between the upper engine cover and the under-hose engine cover 13 in the above embodiment, the present disclosure is not limited to this example. For example, the hose 9 may pass through and cross only the under-hose engine cover 13.

In addition, although the tapered part 9h extends linearly as illustrated in the cross section in FIG. 7 in the above embodiment, the present disclosure is not limited to this example. For example, the tapered part 9h may be shaped like steps or a bellows.

In addition, although the contact part 9i of the hose 9 only makes contact with the inner peripheral surfaces 4e and 13a of the engine covers 4 and 13 in the above embodiment, the present disclosure is not limited to this example. For example, grooves may be inscribed on the inner peripheral surfaces of the through-holes of the engine covers and ribs corresponding to the grooves may be formed in the vicinity of the contact part of the hose so that the ribs are fitted into the grooves. This can more surely suppress the leakage (leakage of hot air) of air even when the internal pressure increases.

In addition, although the type and the installation form of an engine are not particularly described in the above embodiment, various modes can be adopted. For example, the type of an engine may be a gasoline engine or a diesel engine. The installation form may be a horizontal form or a vertical form.

In addition, although the structure in which the hose 9 enters the engine covers 2, 5, and 13 in the vehicle width direction is adopted in the above embodiment, the present disclosure is not limited to this example. For example, the hose 9 may be inserted from the front side.

In addition, although the under-hose engine cover 13 is fixed to the air cleaner 7 and the fresh air duct 8 in the above embodiment, the present disclosure is not limited to this example. For example, the air cleaner or the fresh air duct may be fixed to the under-hose engine cover conversely and then under-hose engine cover may be fixed to the vehicle body.

In addition, although the structure in which the engine 3 is installed in the front part of the vehicle 1 is adopted in the above embodiment, the present disclosure is not limited to this example. For example, the engine may be installed in the rear part of the vehicle or may be installed in the center part of the vehicle.

In addition, although one hose 9 enters the engine covers 4, 5, and 13 in the above embodiment, the present disclosure is not limited to this example. For example, the structure in which two or more hoses enter the engine covers may be adopted.

In addition, although the engine covers 4, 5, 6, and 13 are provided to retain the heat of the engine in the above embodiment, the present disclosure is not limited to this example. For example, the engine covers may be provided so that noise generated by the engine or the like does not easily leak to the outer side or the engine covers for heat retention and noise insulation of the engine may be provided.

In addition, although the upper engine cover 4 is openable and closable separately from the hood in the above embodiment, the present disclosure is not limited to this example. For example, the upper engine cover may be fixed to the inner surface of the hood so that the upper engine cover is opened and closed together when the hood is opened and closed.

In addition, although the opening 9a and the opening 9c of the hose 9 are disposed in positions offset in the up-down direction in the above embodiment, the present disclosure is not limited to this example. For example, both openings may be disposed side by side (offset amount is 0) on a straight line.

SUMMARY OF THE PRESENT DISCLOSURE

An air intake structure for a vehicle according to an aspect of the present disclosure includes an engine, an engine cover that covers an upper side and a lateral side of the engine, and a cross component that crosses an inner side and an outer side of the engine cover.

The engine cover has a through-hole through which the cross component passes.

The cross component is a flexible hose or a flexible pipe and is formed by integrating a body part extending in a direction in which the cross component crosses with a diameter enlarged part having a diameter larger than the body part and an outer peripheral part of the diameter enlarged part makes close contact with an inner peripheral surface of the through-hole of the engine cover.

Since the outer peripheral part of the diameter enlarged part of the cross component makes close contact with the inner peripheral surface of the through-hole of the engine cover in the above aspect, the sealability of the engine cover can be obtained.

In addition, since the body part is formed integrally with the diameter enlarged part in the cross component in the above aspect, increase in the number of components and the manufacturing cost can be suppressed.

Accordingly, in the above aspect, the sealability can be obtained while having the cross component that crosses the inner side and the outer side of the engine cover that covers the upper side and the lateral side of the engine and increase in the number of components and the manufacturing cost can be suppressed.

In the air intake structure for a vehicle according to another aspect of the present disclosure, in the above structure, the engine cover includes an upper engine cover that covers an upper side of the engine and an upper portion of a lateral side of the engine and a lateral engine cover that covers a lower portion of the lateral side of the engine, both the upper engine cover and the lateral engine cover have heat retaining members, and the through-hole is provided at a boundary portion between the upper engine cover and the lateral engine cover.

In the above aspect, since the structure in which both the upper engine cover and the lateral engine cover have the heat retaining members is adopted, the high heat retaining capability of the engine can be obtained.

In addition, since the through-hole of the engine cover is provided at the boundary portion between the upper engine cover and the lateral engine cover in the above aspect, the workability for attaching the cross component that passes through the through-hole is high. Therefore, in the above aspect, the manufacturing efficiency can be improved and the manufacturing cost can be reduced.

In the air intake structure for a vehicle according to another aspect of the present disclosure, in the above structure, when the cross component is seen on a cross section taken along an axis related to the extension of the body part, the diameter enlarged part has a tapered part obliquely extending from the outer side to the inner side of the engine cover and a contact part that has one end part continued with an end portion of the tapered part and the other end part that is a free end and makes close contact with the inner peripheral surface of the through-hole as the outer peripheral part.

Since the diameter enlarged part has the tapered part in the above aspect, even when the inner pressure in the engine cover increases due to travelling wind or the like, air (hot air) does not easily leak from between the inner peripheral surface of the through-hole of the engine cover and the contact part of the cross component. In addition, the contact part has high flexibility because the other end part is a free end and has high sealability with respect to the inner peripheral surface of the through-hole.

It should be noted here that the tapered part may have not only a form that extends linearly from the outer side to the inner side of the engine cover, but also a form that extends like steps and a form that extends like a curve.

In the air intake structure for a vehicle according to another aspect of the present disclosure, in the above structure, the lateral engine cover has a cross part lower cover that is disposed below a portion through which the cross component crosses and separated from other portions.

Since the structure in which the lateral engine cover has the cross part lower cover is adopted in the above aspect, the cross component and the cross part lower cover can be assembled to each other in advance in manufacturing the vehicle. Therefore, the manufacturing efficiency can be improved and increase in the manufacturing cost can be suppressed.

In the air intake structure for a vehicle according to another aspect of the present disclosure, in the above structure, the air intake structure further includes a structural component disposed on the outer side of the engine cover, the structural component is fixed to a vehicle body and the cross part lower cover is fixed to the structural component (structural component disposed on the outer side of the engine cover).

Since the structure in which the cross part lower cover is fixed to the above structural component is adopted in the above aspect, highly accurate assembly between the cross component and the cross part lower cover can be achieved. Therefore, high sealability can be obtained in the above aspect.

In an air intake structure for a vehicle according to another aspect of the disclosure, in the above structure, the upper engine cover is openable and closable about a hinge as a fulcrum provided at one end edge.

Since the upper engine cover is an openable-closable cover in the above aspect, the positional accuracy of the upper engine cover with respect to the cross component in the closed state can be higher and the sealability can be higher than in a detachable cover.

In the air intake structure for a vehicle according to another aspect of the present disclosure, in the above structure, the cross component is a bellows hose in which an external appearance of the body part is shaped like a bellows.

Since the bellows hose is adopted as the cross component in the above aspect, the workability for disposing the cross component so as to cross the engine cover is higher and the manufacturing efficiency can be improved. Therefore, increase in the manufacturing cost can be suppressed in the above aspect.

As described above, in the air intake structures for a vehicle according to the above aspects, the sealability can be obtained while having the component (cross component) that passes through and crosses the inner side and the outer side of the engine cover that covers the upper side and the lateral side of the engine and increase in the number of components and the manufacturing cost can be suppressed.

The invention claimed is:

1. An air intake structure for a vehicle, comprising:
an engine;
an engine cover that covers an upper side and a lateral side of the engine; and
a cross component that crosses an inner side and an outer side of the engine cover,
wherein the engine cover has a through-hole through which the cross component passes,
the cross component is one of a flexible hose and a flexible pipe, and is formed by integrating a body part extending in a direction in which the cross component crosses with a diameter enlarged part having a diameter larger than the body part,
an outer peripheral part of the diameter enlarged part makes close contact with an inner peripheral surface of the through-hole of the engine cover, and
when the cross component is seen on a cross section taken along an axis related to extension of the body part, the diameter enlarged part has a tapered part obliquely extending from the outer side to the inner side of the engine cover, and a contact part that has one end part continued with an end portion of the tapered part and the other end part that is a free end and makes close contact with the inner peripheral surface of the through-hole as the outer peripheral part.

2. An air intake structure for a vehicle, comprising:
an engine;
an engine cover that covers an upper side and a lateral side of the engine; and
a cross component that crosses an inner side and an outer side of the engine cover,
wherein the engine cover has a through-hole through which the cross component passes,
the cross component is one of a flexible hose and a flexible pipe, and is formed by integrating a body part extending in a direction in which the cross component crosses with a diameter enlarged part having a diameter larger than the body part,
an outer peripheral part of the diameter enlarged part makes close contact with an inner peripheral surface of the through-hole of the engine cover,
the engine cover includes an upper engine cover that covers an upper side of the engine and an upper portion of a lateral side of the engine, and a lateral engine cover that covers a lower portion of the lateral side of the engine,
both the upper engine cover and the lateral engine cover have heat retaining members, and
the through-hole is provided at a boundary portion between the upper engine cover and the lateral engine cover.

3. The air intake structure for a vehicle according to claim 2, wherein
when the cross component is seen on a cross section taken along an axis related to extension of the body part, the diameter enlarged part has
a tapered part obliquely extending from the outer side to the inner side of the engine cover, and
a contact part that has one end part continued with an end portion of the tapered part and the other end part that is a free end and makes close contact with the inner peripheral surface of the through-hole as the outer peripheral part.

4. The air intake structure for a vehicle according to claim 2, wherein
the lateral engine cover has a cross part lower cover that is disposed below a portion through which the cross component crosses and separated from other portions.

5. The air intake structure for a vehicle according to claim 4, further comprising:
a structural component disposed on the outer side of the engine cover,
wherein
the structural component is fixed to a vehicle body, and
the cross part lower cover is fixed to the structural component.

6. The air intake structure for a vehicle according to claim 2, wherein
the upper engine cover is openable and closable about a hinge as a fulcrum provided at one end edge.

7. The air intake structure for a vehicle according to claim 1, wherein
the cross component is a bellows hose in which an external appearance of the body part is shaped like a bellows.

8. The air intake structure for a vehicle according to claim 3, wherein the lateral engine cover has a cross part lower cover that is disposed below a portion through which the cross component crosses and separated from other portions.

9. The air intake structure for a vehicle according to claim 8, further comprising:
a structural component disposed on the outer side of the engine cover,
wherein
the structural component is fixed to a vehicle body, and
the cross part lower cover is fixed to the structural component.

10. The air intake structure for a vehicle according to claim 3, wherein
the upper engine cover is openable and closable about a hinge as a fulcrum provided at one end edge.

11. The air intake structure for a vehicle according to claim 4, wherein
the upper engine cover is openable and closable about a hinge as a fulcrum provided at one end edge.

12. The air intake structure for a vehicle according to claim 5, wherein
the upper engine cover is openable and closable about a hinge as a fulcrum provided at one end edge.

13. The air intake structure for a vehicle according to claim 8, wherein
the upper engine cover is openable and closable about a hinge as a fulcrum provided at one end edge.

14. The air intake structure for a vehicle according to claim 9, wherein
the upper engine cover is openable and closable about a hinge as a fulcrum provided at one end edge.

15. The air intake structure for a vehicle according to claim 2, wherein
the cross component is a bellows hose in which an external appearance of the body part is shaped like a bellows.

16. The air intake structure for a vehicle according to claim 3, wherein
the cross component is a bellows hose in which an external appearance of the body part is shaped like a bellows.

17. The air intake structure for a vehicle according to claim 4, wherein
the cross component is a bellows hose in which an external appearance of the body part is shaped like a bellows.

18. The air intake structure for a vehicle according to claim 5, wherein
the cross component is a bellows hose in which an external appearance of the body part is shaped like a bellows.

19. The air intake structure for a vehicle according to claim 6, wherein
the cross component is a bellows hose in which an external appearance of the body part is shaped like a bellows.

20. The air intake structure for a vehicle according to claim 8, wherein
the cross component is a bellows hose in which an external appearance of the body part is shaped like a bellows.

* * * * *